(No Model.) 2 Sheets—Sheet 1.
G. T. PILLINGS.
AUTOMATIC FLUX FEEDING ATTACHMENT FOR SOLDERING MACHINES.
No. 342,383. Patented May 25, 1886.
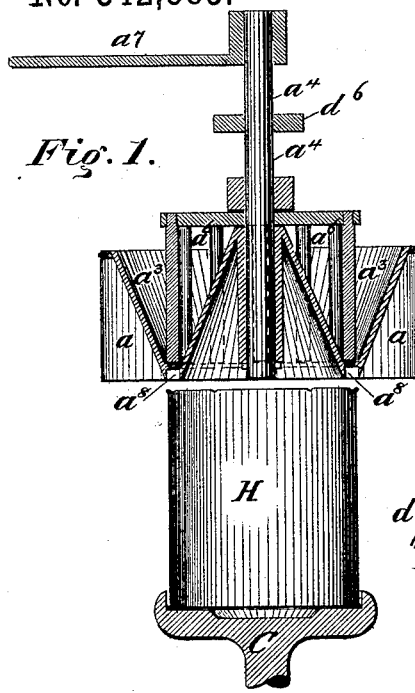
*Fig. 1.*
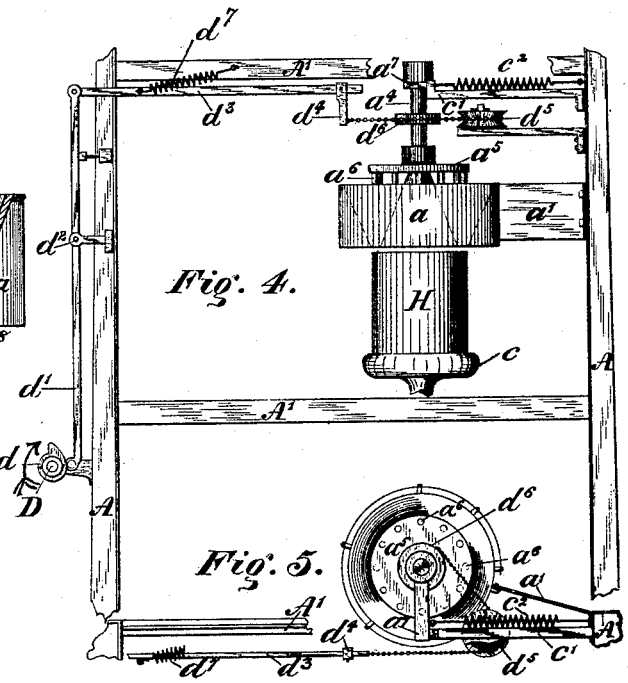
*Fig. 4.*
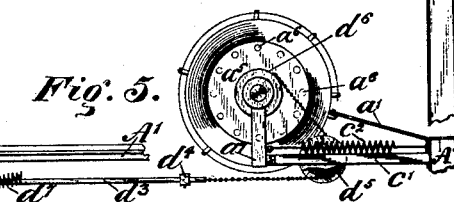
*Fig. 5.*
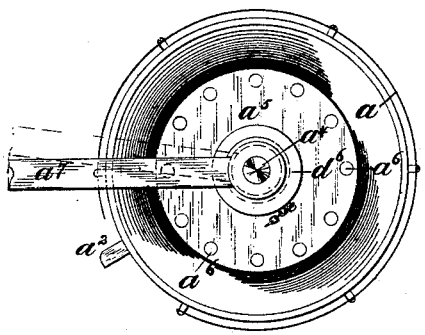
*Fig. 2.* *Fig. 3.*
Witnesses:
G. B. Thomas
James Geo. Stewart
Inventor
George T. Pillings
by
Benj. a Price
Attorney.

(No Model.) 2 Sheets—Sheet 2.

G. T. PILLINGS.

AUTOMATIC FLUX FEEDING ATTACHMENT FOR SOLDERING MACHINES.

No. 342,383. Patented May 25, 1886.

Witnesses:
G. B. Thomas
James Law Stewart

Inventor
George T. Pillings
by
Benj. Price
Attorney

UNITED STATES PATENT OFFICE.

GEORGE T. PILLINGS, OF BALTIMORE, MARYLAND, ASSIGNOR TO R. TYNES SMITH AND WILLIAM A. WICKS, OF SAME PLACE.

AUTOMATIC FLUX-FEEDING ATTACHMENT FOR SOLDERING-MACHINES.

SPECIFICATION forming part of Letters Patent No. 342,383, dated May 25, 1886.

Application filed October 30, 1885. Serial No. 181,394. (No model.)

*To all whom it may concern:*

Be it known that I, GEORGE T. PILLINGS, of the city of Baltimore and State of Maryland, have invented a new and useful Improvement in Soldering-Machines, which consists of an automatic attachment by which the seam to be soldered is duly supplied with resin, ordinarily used as a flux for soldering, and also in the special construction and arrangement of such attachment, of which the following is a full description, in which reference is made to the accompanying drawings, with their letters of reference, of which—

Figure 6:
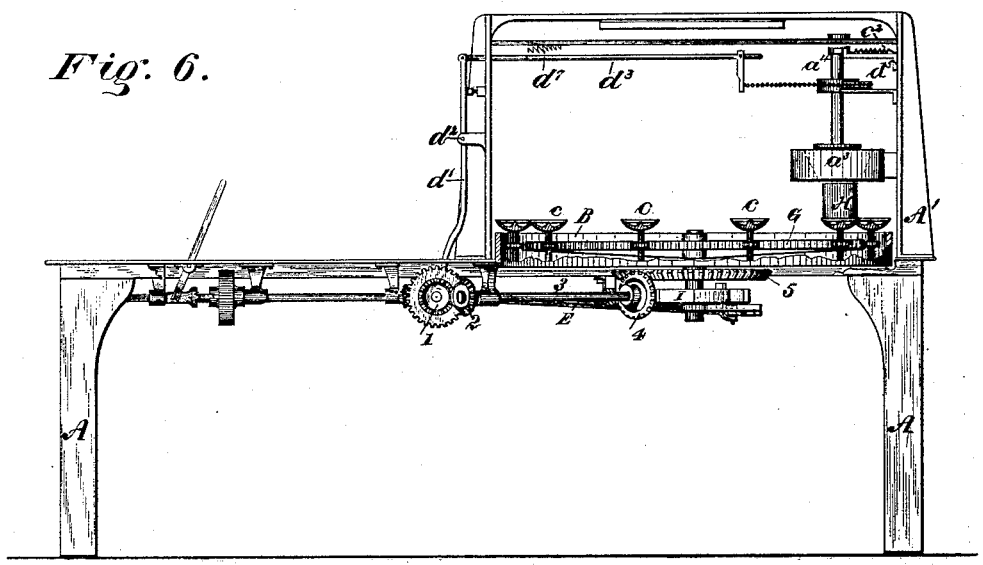
Figure 7:
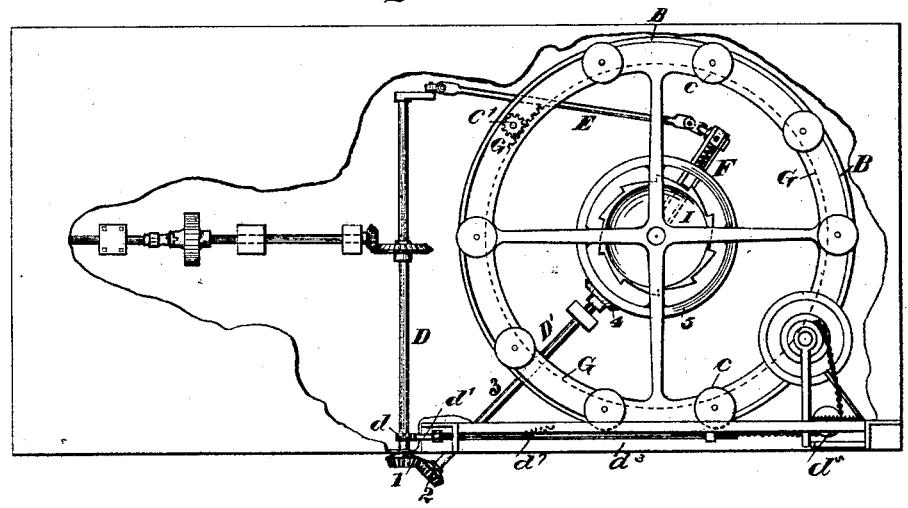

Figure 1 is an upright sectional view of the perforated resin-box and the pins which cover the apertures in the bottom of the box, a can below presenting its seam in position to catch the resin as it drops, and seated upon a revolving arbor. Fig. 2 is a top view of the resin-box, showing the positions of the pins from above and the arm which turns with them to arrest the backward movement of the pins and hold them in position to close the perforations in the box; Fig. 3, a bottom view of the resin-box, showing the perforations and the lug or projection by which it is attached to the frame of the machine; Fig. 4, a side view of a portion of the machine, showing the resin-box in position above a can and the mechanism by which the resin is distributed upon the seam; Fig. 5, a top view of box as shown in Fig. 2, and showing the chain, pulley, and springs by which the pins are turned back and forth; Fig. 6, a side elevation of a form of machine, showing such portions of the apparatus as will be sufficient to illustrate the invention; Fig. 7, a top view of same.

The machine which I have selected to illustrate the invention is one of a class well known in the trade, in which metallic cans are placed upon a revolving disk, which in turn is mounted upon a revolving table, so that the table revolves intermittently, bringing the can under a solder-box, which drops the solder upon the seam, while the can, revolving upon its arbor, receives the solder as it falls into the groove prepared to receive it. Such a machine was patented to Leo Charley Straub on the 20th day of June, 1871, and numbered 116,114, to which I refer for particulars of such machines.

Let A represent the frame of the machine and A' the cross-pieces of said frame; B, a revolving table upon which are arranged the revolving arbors $c$. The revolving shaft D gives intermittent movement through the connecting-rod E and arm F, which carries a spring-pawl, working in the ratchet 1. The shaft D also gives revolving movement to an inner wheel, G, by means of the small pinions 1 and 2 on the shaft D and angle-shaft D', and small pinion 4 and large bevel-gear 5. The wheel 3 works into a pinion, $c'$, which revolves the arbors $c$, upon which the cans rest and are turned with the arbors. When the wheel B revolves to bring the can beneath the soldering device, it is necessary to supply the seam of the can with resin or other flux to flow the solder when melted into the seam.

In the apparatus shown there are ten cans seated upon the disks. Consequently the table is stopped ten times in making one revolution, and at each stoppage the cans are revolved.

Any number of cans may be placed on the machine, and the stoppages should be arranged to correspond with their number.

$a$ is a flux-box attached to a suitable part of the frame of the machine by the bracket $a'$ and the lug $a^2$. It is stationary and may be of any required size, and is constructed with the annular V-shaped recess $a^3$, extending from the top to the bottom of the box. This recess holds the flux, (preferably resin,) and the inclined planes formed by the walls of this recess direct the resin to the apex of the cone at the bottom of the box.

Mounted upon the shaft $a^4$ and securely attached thereto is the disk $a^5$, provided with the pins $a^6$, which project downwardly from the disk and rest upon the bottom of the box, Figs. 1 and 4, which is perforated at the apex of the cone-shaped recess with the same number of apertures as there are pins. The pins are a little larger than the apertures, so that when at rest they cover them and prevent any escape of resin.

Upon the shaft $a^4$, I have placed the bar $a^7$, securely attached thereto, so as to turn with the shaft. Upon the shaft D, I have placed the cam $d$, which works in contact with one end of the lever $d'$. This lever is pivoted to a bracket upon the frame A at $d^2$. The upper end of this lever is connected with the bar $d^3$, which is provided with the arm $d^4$. A chain or cord attached to the arm $d^4$ passes around the pulley $d^5$ and partly around the pulley $d^6$, to which it is secured. The spring $d^7$, with one end attached to the cross-piece A' of the frame and the other to the bar $d^3$, serves to draw back the bar when the cam $d$ has released it. It will be seen from this arrangement that the cam, when in contact with the lever $d'$, will give a slight rotary movement to the pins $a^6$, uncovering the apertures $a^8$, and each pin as it moves pushes a portion of the flux forward, which escapes through the next aperture in front of it, so as to drop in the groove of the can H, which is constantly revolving, and thus receives the flux well distributed upon its seam. When the cam has passed the bar, it is released, and the spring $d^7$ draws it back in place. I have also provided an arrangement which insures that the pins shall always cover the holes when thus drawn back by the spring and take up the slack in the chain, and to accomplish this purpose I have arranged a stop which consists in attaching to the upright of the frame A a bar, $c'$. This bar projects outwardly to a regulated distance, so that when the pins are turned back the arm $a^7$ comes in contact with the end of the bar $c'$, just when the pins are properly over the holes in the bottom of the resin-box. The spring $c^2$, attached at one end to the arm $a^7$ and at the other to the frame A, holds the arm securely against the end of the bar and the pins in position covering the apertures.

The operation of the device is as follows: Cans are placed upon the rotary disk, the table is moved a point and stopped, the pins rotate slightly while the can is turning under the resin-box and receiving the resin upon its seam, the cam releases the lever, and the springs draw the pins back over the apertures in the resin-box and hold it there. The table B makes another partial turn, bringing another can under the box. The same movements are repeated and resin supplied to the next can. This in turn passes on until another takes its place.

What I claim is—

1. In a soldering-machine, a flux-box having perforations in its bottom, in combination with a series of pins arranged to cover the perforations, and mechanism for moving the pins to uncover the perforations and bring them back in place.

2. In a soldering-machine, a circular flux-box provided with an annular V-shaped recess, and a series of perforations in the bottom of the recess, in combination with a series of pins to cover the perforations, and means for moving the pins from the perforations to allow the flux to escape and return the pins to close the perforations, as set forth.

GEORGE T. PILLINGS.

Witnesses:
WM. H. MASSON,
WILLIAM A. WICKS,
JAMES LAW. STEUART.